United States Patent
Okabe et al.

(10) Patent No.: US 10,644,343 B2
(45) Date of Patent: May 5, 2020

(54) DUMMY CELL AND FUEL CELL STACK

(71) Applicant: TOYOTA JIDOSHA KABUSHIKI KAISHA, Toyota-shi, Aichi-ken (JP)

(72) Inventors: Hiroki Okabe, Okazaki (JP); Kazumi Sugita, Nisshin (JP); Chisato Kato, Aichi-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 199 days.

(21) Appl. No.: 15/023,483

(22) PCT Filed: Sep. 12, 2014

(86) PCT No.: PCT/IB2014/001798
§ 371 (c)(1),
(2) Date: Mar. 21, 2016

(87) PCT Pub. No.: WO2015/044732
PCT Pub. Date: Apr. 2, 2015

(65) Prior Publication Data
US 2016/0211543 A1    Jul. 21, 2016

(30) Foreign Application Priority Data

Sep. 27, 2013  (JP) .................................. 2013-200897

(51) Int. Cl.
*H01M 8/24* (2016.01)
*H01M 8/02* (2016.01)
*H01M 8/2465* (2016.01)
*H01M 8/0273* (2016.01)
*H01M 8/1004* (2016.01)
*H01M 8/241* (2016.01)
*H01M 8/247* (2016.01)

(52) U.S. Cl.
CPC ....... *H01M 8/2465* (2013.01); *H01M 8/0273* (2013.01); *H01M 8/1004* (2013.01); *H01M 8/241* (2013.01); *H01M 8/247* (2013.01)

(58) Field of Classification Search
None
See application file for complete search history.

(56) References Cited

U.S. PATENT DOCUMENTS 7,405,019 B2    7/2008  Ohara et al.
7,981,569 B2 *  7/2011  Shirahama .......... H01M 8/0276
                                                    429/492

(Continued)

FOREIGN PATENT DOCUMENTS

CN    2764006 Y  *  3/2006  ............. H01B 11/06
CN    2764006 Y       3/2006
(Continued)

*Primary Examiner* — Maria Laios
*Assistant Examiner* — Angela J Martin
(74) *Attorney, Agent, or Firm* — Dickinson Wright PLLC

(57) ABSTRACT

A dummy cell laminated on a fuel cell stack and configured not to perform power generation includes: a common appearance portion having an appearance common with an appearance of a power generation cell used in the fuel cell stack and configured to perform power generation; and a non-common appearance portion having an appearance different from the appearance of the power generation cell.

6 Claims, 4 Drawing Sheets

(56) References Cited

U.S. PATENT DOCUMENTS

| | | | | |
|---|---|---|---|---|
| 2003/0215693 | A1* | 11/2003 | Asai | H01M 8/0213 |
| | | | | 429/457 |
| 2006/0110649 | A1 | 5/2006 | Nishiyama et al. | |
| 2007/0042250 | A1 | 2/2007 | Inagaki | |
| 2009/0042075 | A1* | 2/2009 | Nakanishi | H01M 8/0256 |
| | | | | 429/434 |

FOREIGN PATENT DOCUMENTS

| | | |
|---|---|---|
| CN | 201384321 Y | 1/2010 |
| CN | 201936948 U | 8/2011 |
| JP | 2005183358 A | 7/2005 |
| JP | 2006-147502 | 6/2006 |
| JP | 2008-130350 | 6/2008 |
| JP | 2009-43493 | 2/2009 |

\* cited by examiner

DUMMY CELL AND FUEL CELL STACK

CROSS-REFERENCE TO RELATED APPLICATIONS

This application is a national phase application of International Application No. PCT/IB2014/001798, filed Sep. 12, 2014, and claims the priority of Japanese Application No. 2013-200897, filed Sep. 27, 2013, the content of both of which is incorporated herein by reference.

BACKGROUND OF THE INVENTION

1. Field of the Invention

The present invention relates to a dummy cell used for a fuel cell stack, and a fuel cell stack including the dummy cell.

2. Description of Related Art

There has been known a fuel cell stack including a dummy cell that does not have a power generation function, in addition to a power generation cell having a power generation function (Japanese Patent Application Publication No. 2008-130350 (JP 2008-130350 A)).

In the manufacture of the fuel cell stack, a power generation cell and a dummy cell are manufactured first, and then, the power generation cell and the dummy cell are assembled together. In a case where common components are used for the power generation cell and the dummy cell, a manufacturing cost thereof can be decreased. However, an outer shape of the power generation cell resembles that of the dummy cell, so that the power generation cell might be confused with the dummy cell.

SUMMARY OF THE INVENTION

A first aspect of the present invention relates to a dummy cell laminated in a fuel cell stack and configured not to perform power generation. The dummy cell includes: a common appearance portion having a first appearance common with an appearance of a power generation cell used in the fuel cell stack and configured to perform power generation; and a non-common appearance portion having a second appearance different from the appearance of the power generation cell. According to the dummy cell, the dummy cell includes, except a part thereof, the common appearance portion having an appearance common with the appearance of the power generation cell used in the fuel cell stack and configured to perform power generation, thereby making it possible to manufacture the dummy cell and the power generation cell in a common manufacturing process. Further, the dummy cell includes the non-common appearance portion having a different shape as the appearance of the power generation cell, thereby making it possible to distinguish the dummy cell from the power generation cell.

In the dummy cell, the non-common appearance portion may be provided in a position where the non-common appearance portion is observable from outside in a state where the power generation cell and the dummy cell are laminated to form the fuel cell stack. According to the dummy cell, even after the laminated body is formed, it is possible to distinguish the dummy cell from the power generation cell and to easily find improper assembly.

In the dummy cell, the non-common appearance portion may have at least a different color or a different shape from the power generation cell. According to the dummy cell, it is possible to easily distinguish the power generation cell from the dummy cell. Even after the dummy cell and the power generation cell are laminated and assembled in the fuel cell stack, it is possible to distinguish the dummy cell from the power generation cell, thereby making it possible to easily find improper assembly.

In the dummy cell, the power generation cell may include a membrane electrode assembly, a power generation portion having a first frame surrounding an outer edge of the membrane electrode assembly by rubber or resin, and first separator plates sandwiching the power generation portion therebetween; the dummy cell may include a conductive member instead of a membrane electrode assembly, a non-power generation portion having a second frame surrounding an outer edge of the conductive member by rubber or resin, and second separator plates having the same shape as the separator plates of the power generation cell and sandwiching the non-power generation portion therebetween; and the non-common appearance portion may be part of the second frame. According to the dummy cell, the first frame of the power generation cell is made different in shape from the second frame of non-power generation portion (the dummy cell), so that it is not necessary to provide any new component.

A second aspect of the present invention relates to a fuel cell stack. The fuel cell stack includes: a laminated body in which a plurality of power generation cells laminated on top of one another, and the dummy cell according to any one of claims 1 to 4 are laminated; and terminal plates provided on both ends of the laminated body. The dummy cell is provided in at least one end of the laminated power generation cells, in a laminating direction of the power generation cells. According to the fuel cell stack, it is possible to distinguish the dummy cell from the power generation cell in appearance, thereby making it possible to easily find improper assembly.

Note that the present invention can be realized in various aspects. For example, the present invention can be realized in a fuel cell stack, a manufacturing method for a fuel cell stack, or the like, other than the dummy cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Figure 1:
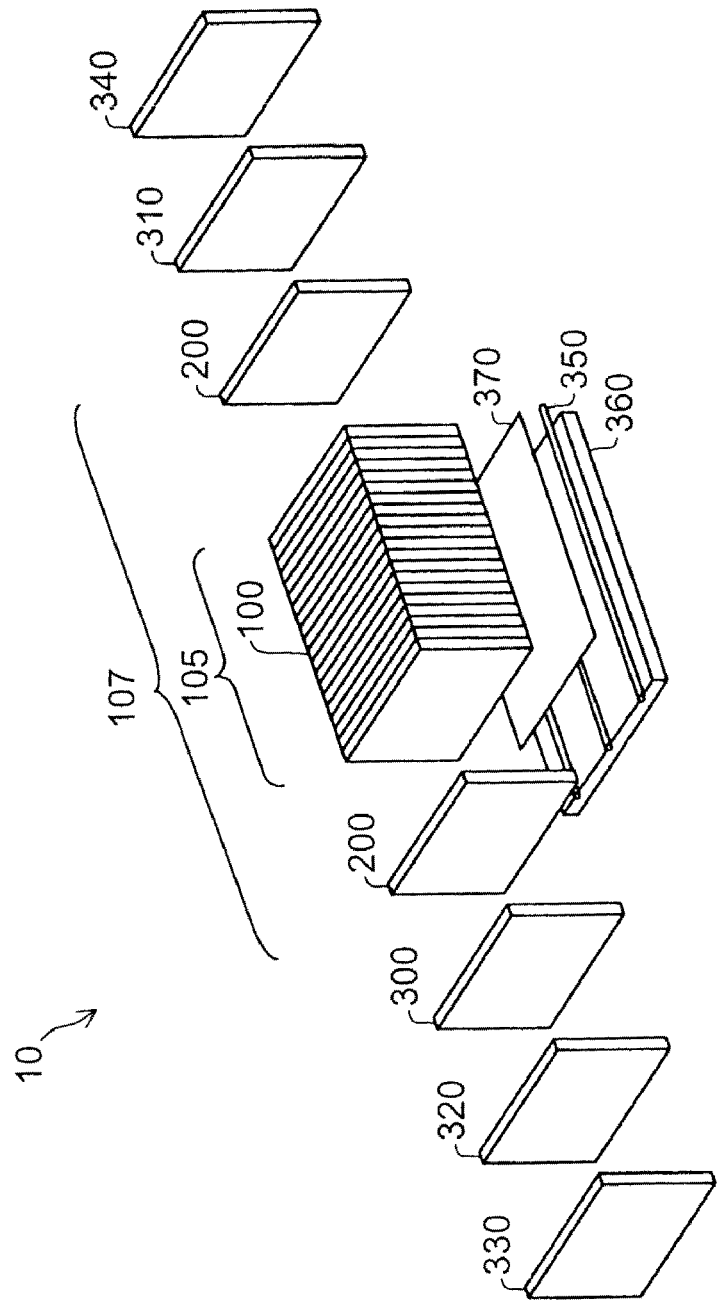
FIG. 1 is a schematic view schematically illustrating a configuration of a fuel cell stack according to one embodiment of the present invention.

FIG. 1 is a schematic view schematically illustrating a configuration of a fuel cell stack according to one embodiment of the present invention. Each member of a fuel cell stack 10 to be described below has a through hole, a groove, or the like. However, FIG. 1 does not illustrate the through hole, the groove, or the like, and just illustrates the fuel cell stack 10 as a generally rectangular solid. The fuel cell stack 10 includes a power generation cell 100, a dummy cell 200, terminal plates 300, 310, an insulator plate 320, a pressure plate 330, an end plate 340, and a tension shaft 350. A plurality of power generation cells 100 is provided, so that the plurality of power generation cells 100 is laminated to form a first laminated body 105. The dummy cell 200 is placed on either side of the laminated body 105 in a laminating direction thereof, so as to form a second laminated body 107. Note that the dummy cell 200 may be placed only on either one of the first laminated body 105 in the laminating direction. Further, in FIG. 1, only one dummy cell 200 is placed on each side of the first laminated body 105 in the laminating direction, but a plurality of dummy cells 200 may be placed on at least one of the sides of the first laminated body 105 in the laminating direction. Further, some of the plurality of power generation cells 100 of the first laminated body 105 may be replaced with dummy cells 200, so that one or more dummy cells are inserted between two power generation cells 100. The terminal plates 300, 310 are placed outside the respective dummy cells 200 in the laminating direction. The terminal plates 300, 310 are used to take out voltage and current generated by the power generation cells 100 to outside. The insulator plate 320 and the pressure plate are placed in this order outside the terminal plate 300 in the laminating direction. The insulator plate 320 electrically insulates the terminal plate 300 from the pressure plate 330. The end plate 340 is placed outside the terminal plate 310 in the laminating direction. The tension shaft 350 fixes from the pressure plate 330 to the end plate 340 to each other with a predetermined force. After the fuel cell stack 10 is fixed by the tension shaft 350 as such, the fuel cell stack 10 is covered with a bottom cover 360 and a head cover (not shown). Note that an insulating sheet 370 is placed between the bottom cover 360 and the fuel cell stack 10.

Figure 2:
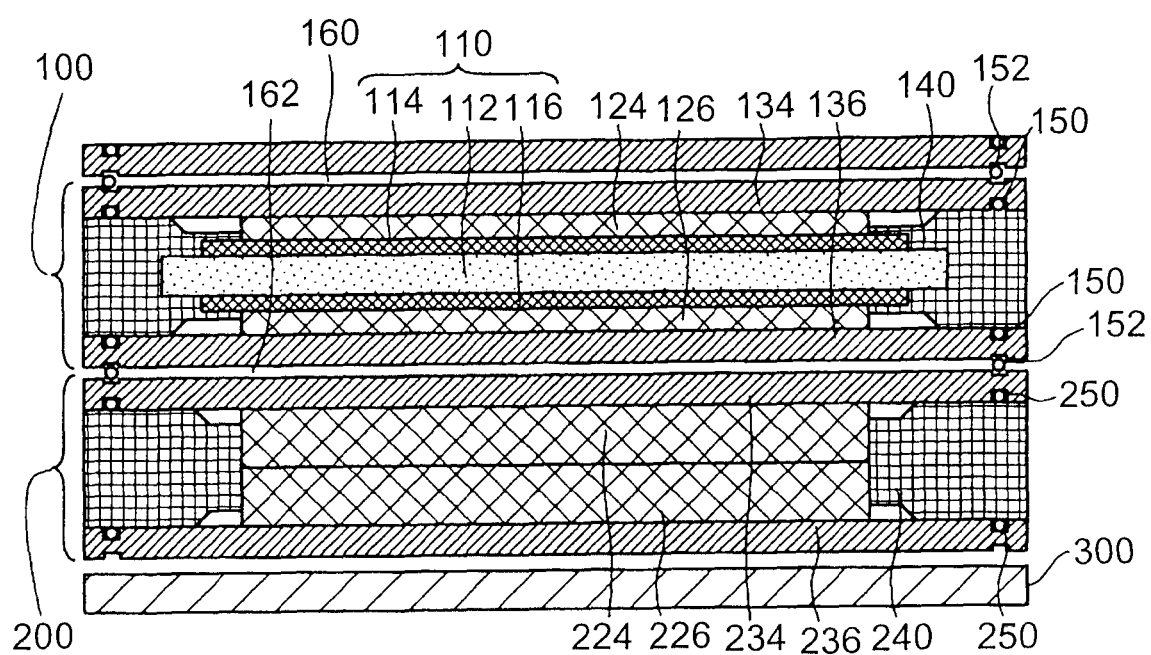
FIG. 2 is an explanatory view schematically illustrating a section of a power generation cell and a dummy cell.

FIG. 2 is an explanatory view schematically illustrating a section of the power generation cell 100 and the dummy cell 200. The power generation cell 100 includes a membrane electrode assembly 110, a first gas diffusion layer 124, a second gas diffusion layer 126, a first separator plate 134, a second separator plate 136, a rubber frame 140, and a seal line 150. The membrane electrode assembly 110 includes an electrolyte membrane 112, a first catalytic layer 114, and a second catalytic layer 116. The electrolyte membrane 112 is formed of a proton conducting ion-exchange membrane made of fluorinated resin such as perfluorocarbon sulfonic acid polymer or hydrocarbon resin. The first catalytic layer 114 and the second catalytic layer 116 are formed on respective surfaces of the electrolyte membrane 112. In the present embodiment, the first catalytic layer 114 and the second catalytic layer 116 are each made of catalyst support particles (e.g., carbon particles) that support platinum catalyst or platinum alloy catalyst made of platinum and other metal, and an electrolyte (ionomer). An outer edge of the membrane electrode assembly 110 is supported by the rubber frame 140.

The first gas diffusion layer 124 and the second gas diffusion layer 126 are placed on the respective sides of the membrane electrode assembly 110. The first gas diffusion layer 124 and the second gas diffusion layer 126 may be such a member that has an electrical conductivity, passes reactant gas therethrough, and diffuses the reactant gas. In the present embodiment, the first gas diffusion layer 124 and the second gas diffusion layer 126 are formed by use of carbon cloth or carbon paper using a carbon nonwoven fabric. In the present embodiment, the carbon cloth or the carbon paper using a carbon nonwoven fabric is used as the first gas diffusion layer 124 and the second gas diffusion layer 126. However, a reactant gas passage using expanded metal, or a reactant gas passage constituted by a metal porous body may be used.

The first separator plate 134 and the second separator plate 136 are placed respectively outside the first gas diffusion layer 124 and the second gas diffusion layer 126. Sizes of outer edges of the first separator plate 134 and the second separator plate 136 are about the same as a size of an outer edge of the rubber frame 140. The seal lines 150 are placed between the first separator plate 134 and the rubber frame 140, and between the second separator plate 136 and the rubber frame 140. The seal lines 150 restrain leakage of reactant gas. The seal lines 150 may be formed integrally with the rubber frame 140, or an O-ring may be used as the seal lines 150.

Next will be described a configuration of the dummy cell 200. When the dummy cell 200 is provided, heat dissipation environment from the power generation cells 100 can be generally equalized in all the power generation cells 100, thereby making it possible to achieve an excellent heat balance between the power generation cells 100. In order to make a good contact pressure balance between the power generation cells 100, it is preferable that the dummy cell 200 have a similar shape to the power generation cells. Further, in terms of the manufacturing cost, if the use of common components between the dummy cell 200 and the power generation cell 100 can be attained, it is possible to reduce the manufacturing cost. Among components (a first separator plate 234, a second separator plate 236, and so on) of the dummy cell 200, the same component as a component of the power generation cell 100 has a reference sign obtained by adding 100 to the reference sign assigned to the component of the power generation cell 100 (the first separator plate 134, the second separator plate 136, and so on). In the present embodiment, the dummy cell 200 has about the same configuration as the power generation cell 100. Note that the dummy cell 200 is different from the power generation cell 100 in that the dummy cell 200 does not include a membrane electrode assembly 110, and a space corresponding to the membrane electrode assembly 110 is filled with gas diffusion layers 224, 226. A central part of a rubber frame 240 of the dummy cell 200 is opened, and placed so that the first gas diffusion layer 224 makes contact with the second gas diffusion layer 226. The first gas diffusion layer 224 and the second gas diffusion layer 226 cause the first separator plate 234 of the dummy cell 200 to be electrically conductive with the second separator plate 236. Note that, instead of the gas diffusion layers 224, 226, other types of conductive members may be provided. As the conductive members, it is preferable to use members that do not have fuel cell power performance.

Further, it is preferable that the dummy cell 200 be configured such that reactant gas does not flow in the first gas diffusion layer 224 and the second gas diffusion layer 226. In the power generation cell 100, a communicating hole (not shown) that communicates a first manifold with the first gas diffusion layer 124 is provided between the first separator plate 134 and the rubber frame 140, and a communicating hole that communicates a second manifold with the second gas diffusion layer 126 is provided between the second separator plate 136 and the rubber frame 140. In the meantime, in the dummy cell 200, such communicating holes are filled with rubber, for example, so that reactant gas does not flow from a first manifold to the first gas diffusion layer 224, or reactant gas does not flow from a second manifold to the second gas diffusion layer 226.

A refrigerant passage 160 is formed between two power generation cells 100, and a refrigerant passage 162 is formed between the power generation cell 100 and the dummy cell 200. The refrigerant passage 160 between two power generation cells 100 is constituted by a groove (not shown) formed outside the first separator plate 134 of one of the two power generation cells 100, and a groove (not shown) formed outside the second separator plate 136 of the other one of the two power generation cells 100. The refrigerant passage 162 between the power generation cell 100 and the dummy cell 200 is constituted by a groove (not shown) formed outside the first separator plate 234 of the dummy cell 200, and a groove (not shown) formed outside the second separator plate 136 of the power generation cell 100. Respective seal lines 152 are placed between the two power generation cells 100 and between the power generation cell 100 and the dummy cell 200, so as to restrain leakage of the refrigerant. The seal lines 152 may be formed of an O-ring, for example. The dummy cell 200 is adjacent to the terminal plate 300.

Figure 3:
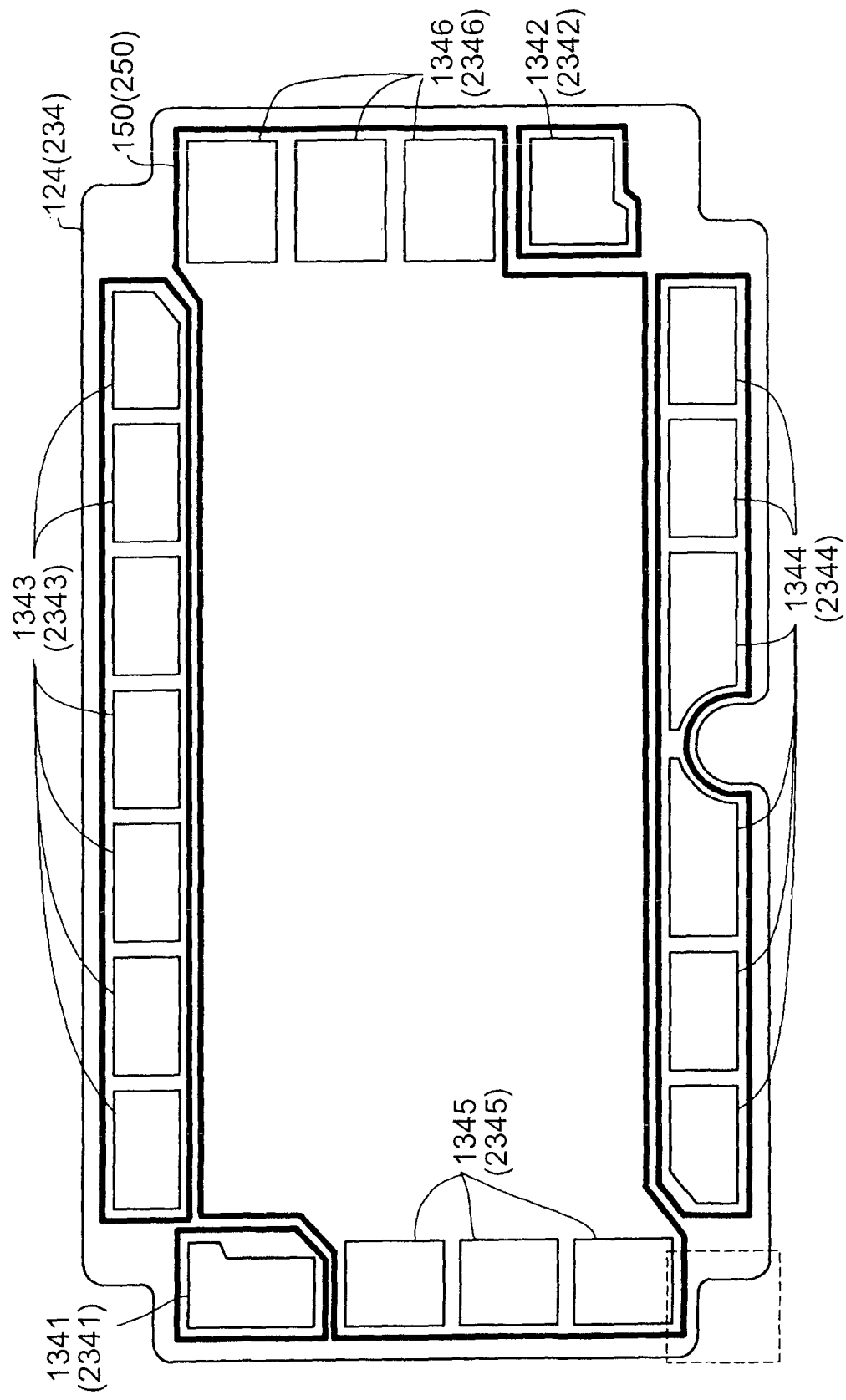
FIG. 3 is a plane view schematically illustrating a state where one cell is observed from a side of a first separator plate.

FIG. 3 is a plane view schematically illustrating a state where one cell is observed from a side of the first separator plate 134. Note that the first separator plate 134 of the power generation cell 100 has the same shape as the first separator plate 234 of the dummy cell 200. Reference signs in the parentheses in FIG. 3 indicate reference signs of members for the dummy cell 200. The first separator plate 134 (234) is a member having a generally rectangular shape, and has a plurality of types of openings 1341 to 1346 (2341 to 2346) on an outer edge thereof. Openings similar to the plurality of types of openings 1341 to 1346 are formed in the second separator plate 136 and the rubber frame 140 of the generation cell 100, and two separator plates 236 and the rubber frame 240 of the dummy cell 200. When the power generation cell 100 and the dummy cell 200 are laminated, these openings are connected to each other so as to form manifolds for supply and discharge of fuel gas, manifolds for supply and discharge of oxidant gas, and manifolds for supply and discharge of the refrigerant. The seal line 150 is placed so as to surround these openings 1341 to 1346.

Figure 4:
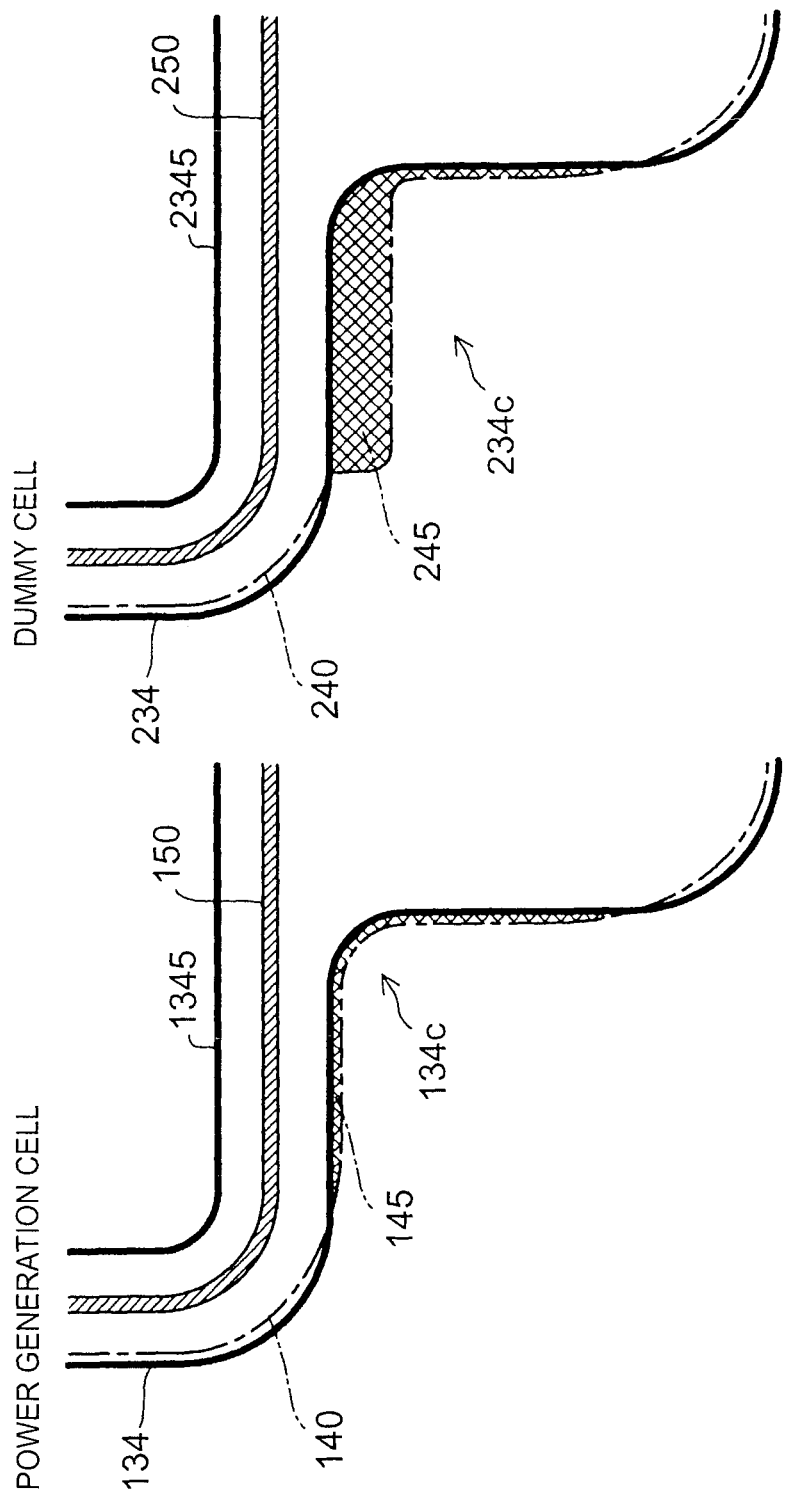
FIG. 4 is an enlarged explanatory view of a part of FIG. 3.

FIG. 4 is an enlarged explanatory view of a part (a broken line part) of FIG. 3. In the present embodiment, a notch portion 134*c* is formed in each of four corners of the first separator plate 134. A portion 145 of the rubber frame 140 of the power generation cell 100 protrudes from the notch portion 134*c*. The separator plate 134 of the power generation cell 100 has generally the same shape as the separator plate 234 of the dummy cell 200. In the meantime, a shape of that rubber frame 140 of the power generation cell 100 which protrudes from the notch portion 134*c* is partially different from a shape of the rubber frame 240 of the dummy cell 200. That is, as illustrated in FIG. 4, a shape of that projecting portion 145 of the rubber frame 140 of the power generation cell 100 which protrudes from the first separator plate 134 is different from a shape of that projecting portion 245 of the rubber frame 240 of the dummy cell 200 which protrudes from the first separator plate 234. Accordingly, even after the power generation cell 100 and the dummy cell 200 are assembled together, it is possible to distinguish the power generation cell 100 from the dummy cell 200 in appearance based on a difference in shape between the projecting portion 145 and the projecting portion 245. That is, the projecting portion 245 of the rubber frame 240 of the dummy cell 200 can be considered as a non-common appearance portion that has an appearance having a different shape from its corresponding portion 145 of the power generation cell 100. The other portion of the dummy cell 200 except the non-common appearance portion can be considered as a common appearance portion having a common appearance with the power generation cell 100. Here, the common appearance portion may be about thicknesses of the separator plates 134, 136 of the power generation cell 100 and thicknesses of the separator plates 234, 236 of the dummy cell 200. In this case, it is possible to form the separator plates 134, 136 for the power generation cell 100 and the separator plates 234, 236 for the dummy cell 200 from a common steel sheet. Further, the power generation cell 100 and the dummy cell 200 are merely slightly different from each other in terms of the shapes of the rubber frames 140, 240 except whether the membrane electrode assembly 110 is provided or not. Accordingly, another new component is unnecessary, and it is possible to manufacture the power generation cell 100 and the dummy cell 200 by use of the same manufacturing apparatus. This makes it possible to reduce the manufacturing cost.

In the present embodiment, those parts of the rubber frame 140 and the rubber frame 240 which have different shapes are placed in positions of the notch portions 134*c*, 234*c* provided in the corners of the first separator plates 134, 234, thereby allowing interference thereof with the tension shaft 350 and an upper case at the time of assembling of the laminated body 105. This makes it possible to downsize an assembly device.

Note that, in the present embodiment, the portion (the non-common appearance portion) where the dummy cell 200 is different from the power generation cell 100 is the shapes of the rubber frames 140, 240 placed in the notch portions 134*c*, 234*c* provided in the corners of the first separator plates 134, 234, but the portion may be any portion provided that the portion is provided observable. Further, members of the power generation cell 100 and the dummy cell 200 are generally checked before laminating. In view of this, different portions from each other may be placed in an area where the different portions are not observable from outside after laminating, or may be placed in an area where the different portions are observable from outside after laminating. In the present embodiment, the dummy cell 200 and the power generation cell 100 each have a rectangular shape having four sides. Here, three sides of the dummy cell 200 may be formed in the same shape as three sides of the power generation cell 100. When the power generation cell 100 and the dummy cell 200 are assembled together, the three sides of the dummy cell 200 are formed in the same shape as the three sides of the power generation cell 100 in terms of appearance. As a result, when the power generation cell 100 and the dummy cell 200 are laminated to form the second laminated body 107, it is possible to improve mountability to a case. The second laminated body 107 has a generally rectangular solid shape. For example, if the dummy cell 200 is larger than the power generation cell 100, the dummy cell 200 partially protrudes from the rectangular solid, so that it is necessary to consider measures for partial contact. However, the aforementioned configuration does not require such measures. Further, even if the second laminated body 107 is bound from outside, three surfaces thereof are formed in a flat manner, so that it is possible to bind the second laminated body 107 without being affected by the position and the number of dummy cells 200.

In the present embodiment, the rubber frame 140 and the rubber frame 240 have different shapes, but they may be distinguished from each other based on other elements observable in appearance. For example, the rubber frame 140 and the rubber frame 240 may be formed in different colors.

In the present embodiment, the rubber frame 240 is formed by use of rubber, but the rubber frame 240 may be a frame made of resin instead of rubber. Further, the separator plate 234 (or the separator plate 236) for the dummy cell 200 may have a shape or color partially different from that of the separator plate 134 (or the separator plate 136) for the power generation cell 100. Further, instead of changing the shape or color of the rubber frame 240, an identification indicator such as an identification mark, an identification number, or a bar code may be provided on a member of at least one of the power generation cell 100 and the dummy cell 200 in any step after or before the manufacture thereof.

The embodiment of the present invention has been described above based on some examples, but the above embodiment of the present invention is intended to facilitate understanding of the present invention, and not to limit the present invention. The present invention includes modifications and alterations of the above embodiment, and also includes their equivalent.

What is claimed is:

1. A fuel cell stack comprising:
a laminated body in which a plurality of power generation cells laminated on top of one another; and
terminal plates provided on both ends of the laminated body, wherein:
a dummy cell is provided in at least one end of the laminated power generation cells, in a laminating direction of the power generation cells;
wherein the dummy cell is laminated in the fuel cell stack and configured not to perform power generation, the dummy cell further comprising:
a first appearance portion having an appearance identical to an appearance of a power generation cell used in the fuel cell stack and configured to perform power generation; and
a second appearance portion having an appearance different from the appearance of the power generation cell, wherein
the second appearance portion is provided in a position where the second appearance portion is observable from outside of the fuel cell stack when a power generation cell and the dummy cell are laminated to form the fuel cell stack;
the second appearance portion has a different shape from the power generation cell when viewed from a laminating direction of the power generation cells;
the dummy cell includes a conductive member, a non-power generation portion having a second frame surrounding an outer edge of the conductive member, and second separator plates having the same shape as first separator plates of the power generation cell and sandwiching the non-power generation portion therebetween;
the second appearance portion is part of the second frame and is a projecting portion of the second frame, the projecting portion protrudes from a notch portion formed in at least one corner of the second separator plate of the dummy cell; and
the projecting portion of the second frame has a different shape than a corresponding projecting portion of the power generating cell.

2. The dummy cell according to claim 1, wherein:
the second appearance portion has at least a different color from the power generation cell.

3. The dummy cell according to claim 1, wherein:
the dummy cell includes a conductive member instead of a membrane electrode assembly, the second frame surrounding an outer edge of the conductive member comprises rubber or resin, and
the second appearance portion is part of the second frame.

4. The fuel cell stack according to claim 1, wherein:
a color of the second appearance portion is different from a color of the power generation cell.

5. The dummy cell according to claim 1, wherein:
the second appearance portion is a projecting portion of a frame of the dummy cell surrounding an outer edge of a conductive member of the dummy cell, the projecting portion protruding from a notch portion formed in each of four corners of a second separator plate of the dummy cell.

6. The dummy cell according to claim 1, wherein a plurality of projecting portions of the second frame protrude from notch portions in each of four corners of the second separator plate of the dummy cell.

* * * * *